United States Patent
Hong et al.

(10) Patent No.: US 12,543,152 B2
(45) Date of Patent: Feb. 3, 2026

(54) PAGING COLLISION PROCESSING METHODS AND APPARATUSES, USER EQUIPMENT NETWORK DEVICE AND STORAGE MEDIUM

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 353 days.

(21) Appl. No.: 18/245,083

(22) PCT Filed: Sep. 23, 2020

(86) PCT No.: PCT/CN2020/117224
§ 371 (c)(1),
(2) Date: Mar. 13, 2023

(87) PCT Pub. No.: WO2022/061616
PCT Pub. Date: Mar. 31, 2022

(65) Prior Publication Data
US 2023/0379883 A1     Nov. 23, 2023

(51) Int. Cl.
*H04W 68/02*     (2009.01)
(52) U.S. Cl.
CPC .................. *H04W 68/02* (2013.01)
(58) Field of Classification Search
CPC ...... H04W 68/02; H04W 68/00; H04W 76/27
See application file for complete search history.

(56) References Cited

U.S. PATENT DOCUMENTS

| | | | |
|---|---|---|---|
| 2009/0215472 A1 | 8/2009 | Hsu | |
| 2010/0136903 A1* | 6/2010 | Lee | H04L 25/03343 455/17 |
| 2018/0368099 A1 | 12/2018 | Chen et al. | |
| 2020/0267719 A1 | 8/2020 | Huang et al. | |
| 2021/0212147 A1* | 7/2021 | Zheng | H04W 24/10 |
| 2021/0289381 A1* | 9/2021 | Yan | H04W 24/10 |
| 2021/0345292 A1* | 11/2021 | Bao | H04W 28/0268 |
| 2022/0417903 A1* | 12/2022 | Liu | H04W 68/12 |

(Continued)

FOREIGN PATENT DOCUMENTS

| | | |
|---|---|---|
| CN | 110913497 A | 3/2020 |
| CN | 110944355 A | 3/2020 |

(Continued)

OTHER PUBLICATIONS

State Intellectual Property Office of the People's Republic of China, Office Action and Search Report Issued in Application No. 2020800024372, May 16, 2023, 12 pages.

(Continued)

*Primary Examiner* — Nader Bolourchi
(74) *Attorney, Agent, or Firm* — Volpe Koenig (57) ABSTRACT

The paging collision processing method includes: when a user equipment (UE) determines occurrence of a paging collision, reporting paging collision indication information to a network device; after the network device receives the paging collision indication information, acquiring paging collision resolution information and sending the paging collision resolution information to the UE.

18 Claims, 3 Drawing Sheets

---

The UE determines occurrence of a paging collision — 201

The UE reports paging collision indication information to a network device — 202

(56) References Cited

U.S. PATENT DOCUMENTS

| | | | | |
|---|---|---|---|---|
| 2023/0284056 A1* | 9/2023 | Fu | ............ | H04W 16/28 370/328 |
| 2023/0319779 A1* | 10/2023 | Hong | ............ | H04W 68/02 370/329 |
| 2023/0337182 A1* | 10/2023 | Hong | ............ | H04W 4/50 |
| 2023/0354010 A1* | 11/2023 | Hong | ............ | H04W 8/24 |

FOREIGN PATENT DOCUMENTS

| | | | | |
|---|---|---|---|---|
| CN | 111133803 | A | 5/2020 | |
| CN | 111278106 | A | 6/2020 | |
| CN | 111294789 | A | 6/2020 | |
| CN | 111512657 | A | 8/2020 | |
| CN | 112219429 | A | 1/2021 | |
| CN | 112237036 | A | 1/2021 | |
| WO | 2017/133461 | A1 | 8/2017 | |
| WO | 2020/151699 | A1 | 7/2020 | |
| WO | 2020/154993 | A1 | 8/2020 | |
| WO | WO-2021234519 | A1 * | 11/2021 | ............ H04W 64/00 |

OTHER PUBLICATIONS

ISA State Intellectual Property Office of the People's Republic of China, Written Opinion of the International Searching Authority Issued in Application No. PCT/CN2020/117224, Jun. 23, 2021, WIPO, 11 pages.

CMCC, "Discussion on the paging collision and interruption issues for multi-sim UEs", 3GPP TSG-RAN WG2 Meeting #111 electronic, R2-2007418, Online, Aug. 17-28, 2020, 2 pages.

ISA State Intellectual Property Office of the People's Republic of China, International Search Report Issued in Application No. PCT/CN2020/117224, Jun. 23, 2021, WIPO, 6 pages.

State Intellectual Property Office of the People's Republic of China, Office Action and Search Report Issued in Application No. 2020800024372, Sep. 9, 2022, 17 pages.(Submitted with Machine/Partial Translation).

Intel at al "Solution for Paging Reception with PO collision avoidance" "SA WG2 Meeting #S2-136 S2-1911942 Nov. 18-22, 2019, Reno, NV, US (revision of 1097, 1143, 1208, 1796)" Nov. 22, 2019,4 pages.

Qualcomm Incorporated"Handling of paging collision for Multi-SIM" "3GPP TSG-RAN WG2 Meeting #111-e R2-2006944 Electronic, Aug. 17-28, 2020" Aug. 28, 2020, 4 pages.

Ericsson"Paging collision avoidance" "3GPP TSG-RAN WG2 #111e Tdoc R2-2007603 Electronic meeting, Aug. 17-28, 2020" Aug. 28, 2020, 4 pages.

* cited by examiner

PAGING COLLISION PROCESSING METHODS AND APPARATUSES, USER EQUIPMENT NETWORK DEVICE AND STORAGE MEDIUM

CROSS REFERENCE TO RELATED APPLICATIONS

The present application is a U.S. national stage of International Application No. PCT/CN2020/117224 filed on Sep. 23, 2020, the disclosure of which is hereby incorporated by reference in its entirety for all purposes.

TECHNICAL FIELD

The present disclosure relates to the paging processing technologies, and in particular to paging collision processing methods and apparatuses, a user equipment (UE), a network device and a storage medium.

BACKGROUND

For a User Equipment (UE) supporting multiple Subscriber Identity Module (SIM) cards, when a network possibly causes paging occasions (PO) of different SIM cards of the UE to collide, the multi-SIM-card UE cannot receive or omits to receive a paging signaling, further leading to failure to establish service.

SUMMARY

In view of this, in the embodiments of the present disclosure, there are provided paging collision processing methods and apparatuses, a user equipment, a network device and a storage medium.

According to a first aspect of the present disclosure, there is provided a paging collision processing method, including:
  when a user equipment (UE) determines occurrence of a paging collision, reporting paging collision indication information to a network device.

According to a second aspect of the present disclosure, there is provided a paging collision processing method, including:
  receiving, by a network device, paging collision indication information, acquiring paging collision resolution information and sending the paging collision resolution information to a user equipment (UE).

According to a third aspect of the present disclosure, there is provided a paging collision processing method, including:
  receiving, by a second network device, paging collision indication information forwarded by a first network device; where the paging collision indication information is sent by a user equipment (UE) to the first network device; and
  generating, by the second network device, paging collision resolution information based on the paging collision indication information and sending the paging collision resolution information to the UE.

According to a fourth aspect of embodiments of the present disclosure, there is provided a user equipment, including a processor, a transceiver, a memory and an executable program stored in the memory and executed by the processor, where the processor runs the executable program to perform the paging collision processing method mentioned in the first aspect of the embodiments of the present disclosure.

According to a fifth aspect of embodiments of the present disclosure, there is provided a network device, including a processor, a transceiver, a memory and an executable program stored in the memory and executed by the processor, where the processor runs the executable program to perform the paging collision processing method mentioned in the second aspect of the embodiments of the present disclosure.

According to a sixth aspect of embodiments of the present disclosure, there is provided a network device, including a processor, a transceiver, a memory and an executable program stored in the memory and executed by the processor, where the processor runs the executable program to perform the paging collision processing method mentioned in the third aspect of the embodiments of the present disclosure.

According to a seventh aspect of embodiments of the present disclosure, there is provided a storage medium storing an executable program which is executed by a processor to perform the above paging collision processing method.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the term "if" as used herein may be interpreted as "when" or "upon" or "in response to determining".

Figure 1:
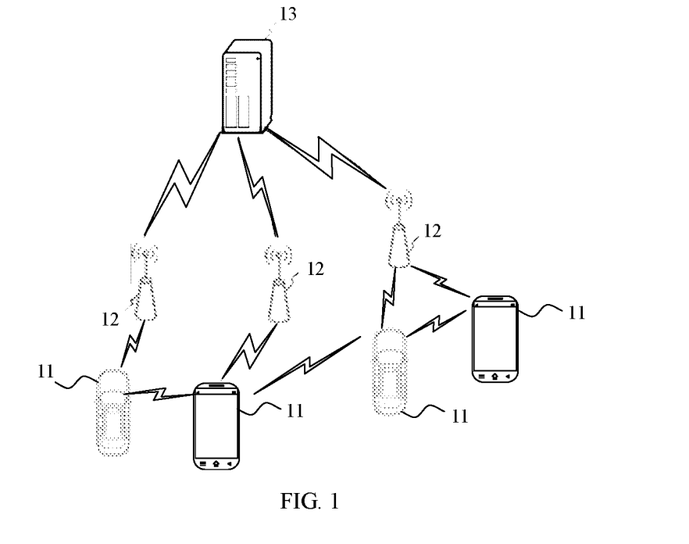
FIG. 1 is a structural schematic diagram illustrating a wireless communication system according to an embodiment of the present disclosure.

FIG. 1 is a structural schematic diagram illustrating a wireless communication system according to an embodiment of the present disclosure. As shown in FIG. 1, the wireless communication system is a communication system based on cellular mobile communication technology and may include a plurality of terminals 11 and a plurality of base stations 12.

The terminal 11 may be a device directed toward a user to provide voice and/or data connectivity. The terminal 11 may communicate with one or more core networks through a radio access network (RAN). The terminal 11 may be a terminal of internet of things, such as a sensor device, a mobile phone (or called cellular phone), and a computer having a terminal of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, user agent, user device, or user equipment (UE). In some examples, the terminal 11 may also be a device of an unmanned aerial vehicle, or a vehicle-mounted device, for example, may be a trip computer having wireless communication function, or a wireless communication device externally connected to a trip computer. In some examples, the terminal 11 may also be a roadside device, for example, may be a road lamp, signal lamp or other roadside devices having wireless communication function.

The base station 12 may be a network side device in a wireless communication system. The wireless communication system may be a fourth-generation mobile communication technology (4G) system, which is also called Long Term Evolution (LTE) system. In some examples, the wireless communication system may also be a 5G system, which is also called new radio (NR) system or 5G NR system. In some examples, the wireless communication system may also be a next generation system of the 5G system. An access network in the 5G system may be referred to as New Generation-Radio Access Network (NG-RAN). In some examples, the wireless communication system may also be a Machine-Type Communication (MTC) system.

The base station 12 may be an evolved base station (eNB) employed in the 4G system. In some examples, the base station 12 may also be a base station adopting centralized distributed architecture (gNB) in the 5G system. When adopting the centralized distributed architecture, the base station 12 usually includes a central unit (CU) and at least two distributed units (DU). In the central unit, protocol stacks of a Packet Data Convergence Protocol (PDCP) layer, a Radio Link Control (RLC) layer and a Media Access Control (MAC) layer are disposed; in the distributed unit, a physical (PHY) layer protocol stack is disposed. The specific implementations of the base station 12 are not limited in the embodiments of the present disclosure.

Wireless connection may be established between the base station 12 and the terminal 11 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface; or, the wireless air interface may also be a wireless air interface based on a next generation mobile communication network technology standard of 5G.

In some embodiments, end to end (E2E) connection may also be established between the terminals 11, for example, in the scenarios of vehicle to vehicle (V2V) communication, vehicle to Infrastructure (V2I) communication, and vehicle to pedestrian (V2P) communication and the like in vehicle to everything (V2X) communication.

In some embodiments, the above wireless communication system may further include a network management device 13.

A plurality of base stations 12 are connected to the network management device 13 respectively. The network management device 13 may be a core network device in the wireless communication system, for example, the network management device 13 may be a Mobility Management Entity (MME) in an Evolved Packet Core (EPC). In some examples, the network management device may also be another core network device, such as Serving GateWay (SGW), Public Data Network GateWay (PGW), Policy and Charging Rules Function (PCRF), or Home Subscriber Server (HSS). The implementation morphology of the network management device 13 is not limited in the embodiments of the present disclosure.

The execution subject involved in the embodiments of the present disclosure includes but not limited to a user equipment in a cellular mobile communication system, and a base station of a cellular mobile communication and the like.

Figure 2:
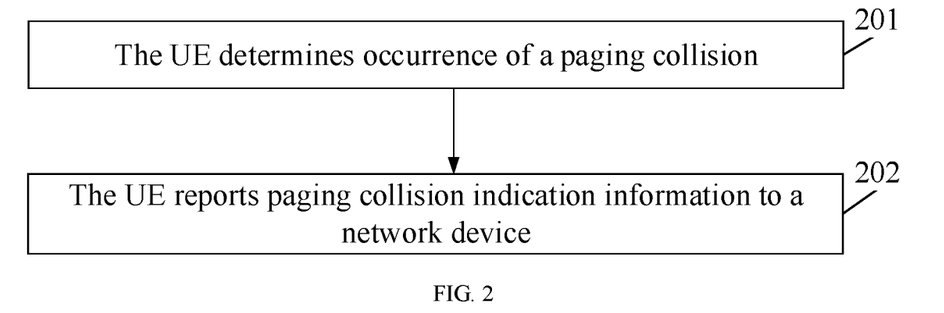
FIG. 2 is a flowchart illustrating a paging collision processing method according to an embodiment of the present disclosure.

FIG. 2 is a flowchart illustrating a paging collision processing method according to an embodiment of the present disclosure. As shown in FIG. 2, the paging collision processing method in this example is applicable to a UE side and may include the following steps 201 and 202.

At step 201, the UE determines occurrence of a paging collision. In an embodiment of the present disclosure, the UE supports communication of multiple SIM cards. When a network side initiates paging for multiple SIM cards of the UE, paging occasion (PO) overlap may occur between multiple SIM cards, leading to paging collision. In this case, a paging signaling initiated cannot be accurately accepted, resulting in failure to establish service. If corresponding processing is not performed on the paging collision, it is still highly possible that paging collision occurs next time. The UE may determine whether a paging collision occurs.

For example, in some embodiments, the UE may, based on the PO of each SIM card, determine whether a paging collision occurs.

At step 202, the UE reports paging collision indication information to a network device. When determining a paging collision occurs, the UE may report paging collision indication information to the network device. Specifically, the UE may report the paging collision indication information to the network device through at least one of SIM cards in an inactive state in multiple SIM cards. The UE may indicate a SIM card in an inactive state in the SIM cards subjected to paging collision to report the paging collision indication information to the network device. The network device herein may be a base station or the like.

As an implementation, the UE may report the paging collision indication information to the network device through two or more SIM cards in an inactive state in multiple SIM cards. When paging collision occurs to two or more SIM cards and the two or more SIM cards are in an inactive state, the paging collision indication information may be reported to the network device through the two or more SIM cards in an inactive state.

As an implementation, the UE in an inactive state may report the paging collision indication information to the network device in a connection resume process. Specifically, the UE reports the paging collision indication information to the network device through a radio resource control (RRC) signaling. In some examples, the UE reports the paging collision indication information to the network device through an RRCResumeRequest signaling or an RRCConnectionResumeRequest signaling. In some examples, the UE reports the paging collision indication information to the network device through an RRCResumeComplete signaling or an RRCConnectionResumeComplete signaling.

Figure 3:
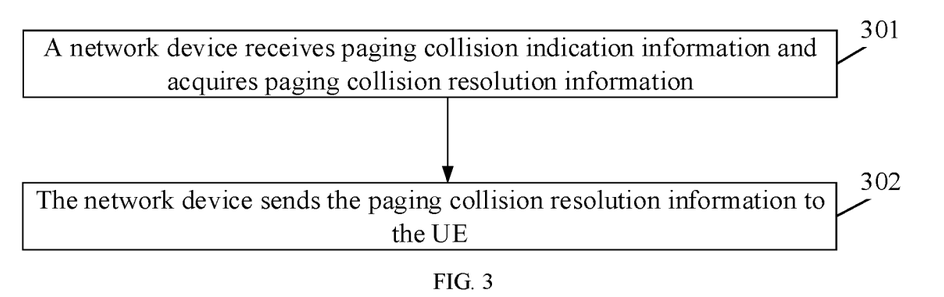
FIG. 3 is a flowchart illustrating a paging collision processing method according to an embodiment of the present disclosure.

FIG. 3 is a flowchart illustrating a paging collision indication information according to an embodiment of the present disclosure. As shown in FIG. 3, the paging collision processing method in this embodiment is applicable to a base station side and includes the following steps, 301 and 302.

At step 301, a network device receives paging collision indication information and acquires paging collision resolution information.

After the network device, for example, a base station, receives paging collision indication information from a SIM card of a user equipment (UE), the network device generates paging collision resolution information.

In an embodiment of the present disclosure, the paging collision resolution information includes at least one of the following information: paging reason, UE_offset, paging occasion offset (PO_offset) or allocated new UE identifier information.

The paging reason may be a reason why a network side initiates a paging for a SIM card, where the paging includes a paging initiated for a particular service or a paging initiated for addressing or the like. In some examples, the paging collision resolution information includes new SIM card identifier information indicated for the UE. For example, a corresponding value is added to or subtracted from the SIM card identifier information of the UE, so as to change the POs of the SIM cards subjected to paging collision, thereby avoiding paging collision between the SIM cards. In some examples, a paging occasion offset PO_offset is indicated for different SIM cards to avoid PO collision between the SIM cards. In some examples, new identifier information is allocated to the SIM cards subjected to paging collision to change the POs of the SIM cards subjected to paging collision, thereby avoiding paging collision between the SIM cards.

At step 302, the network device sends the paging collision resolution information to the UE.

The network device receives the paging collision indication information through a connection resume request signaling. Specifically, the network device sends the paging collision resolution information to a connection-resumed SIM card of the UE through a radio resource control (RRC) signaling, and/or the network device sends, through the RRC signaling, the paging collision resolution information to a SIM card sending a connection resume request to the network device. The network device sends the paging collision resolution information to a connection-resumed SIM card of the UE through an RRCResume signaling or an RRCConnectionResume signaling, and/or the network device sends, through an RRCResume signaling or an RRCConnectionResume signaling, the paging collision resolution information to a SIM card sending a connection resume request to the network device.

In an embodiment of the present disclosure, when the network device determines reception of the paging collision indication information from two or more SIM cards of the UE, the network device generates the paging collision resolution information for at least one of the two or more SIM cards. When paging collision occurs to two SIM cards, paging occasion (PO) overlap may be avoided by changing identifier information of one of the two SIM cards, or by changing the identifier information or paging offsets or the like of the two SIM cards at the same time. When paging collision occurs to three or more SIM cards, paging collision may be avoided by changing the identifier information or paging offset of one of the three or more SIM cards or by changing the identifier information or paging offsets of two or more SIM cards of the three or more SIM cards or by changing the identifier information or paging offsets of all of the SIM cards. In this way, paging collision of the SIM cards can be avoided.

Figure 4:
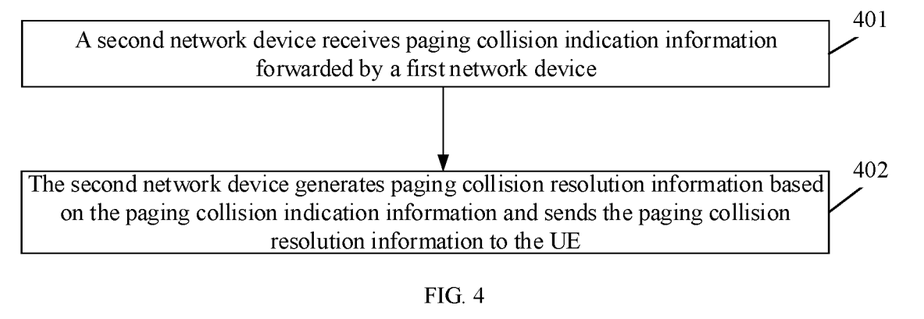
FIG. 4 is a flowchart illustrating a paging collision processing method according to an embodiment of the present disclosure.

FIG. 4 is a flowchart illustrating a paging collision processing method according to an embodiment of the present disclosure. As shown in FIG. 4, the paging collision processing method in this embodiment is applicable to a network device at core network side and includes the following steps, 401 and 402.

At step 401, a second network device receives paging collision indication information forwarded by a first network device; where the paging collision indication information is sent by a user equipment (UE) to the first network device.

In an embodiment of the present disclosure, the second network device may be a core network, and the first network device may be a base station, a relay station and the like. The first network device may, after receiving the paging collision indication information reported by the UE, directly forward the paging collision indication information to the core network side which then generates paging collision resolution information and notifies the UE of paging collision resolution information.

At step 402, the second network device generates paging collision resolution information based on the paging collision indication information and sends the paging collision resolution information to the UE.

In an embodiment of the present disclosure, sending the paging collision resolution information to the UE may be that: for example, the second network device sends, through a non-access stratum (NAS) signaling, the paging collision resolution information to a connection-resumed SIM card of the UE, and/or the second network device sends, through an NAS signaling, the paging collision resolution information to a SIM card sending a connection resume request to the first network device. As an implementation, the second network device may also send the paging collision resolution information to the UE through the first network device.

In an embodiment of the present disclosure, the paging collision resolution information includes at least one of the following information: paging reason, UE_offset, paging occasion offset (PO_offset) or allocated new UE identifier information.

The paging reason may be a reason why a network side initiates a paging for a SIM card, where the paging includes a paging initiated for a particular service or a paging initiated for addressing or the like. In some examples, the paging collision resolution information includes new SIM card identifier information indicated for the UE. For example, a corresponding value is added to or subtracted from the SIM card identifier information of the UE, so as to change the POs of the SIM cards subjected to paging collision, thereby avoiding paging collision between the SIM cards. In some examples, a paging occasion offset PO_offset is indicated for different SIM cards to avoid PO collision between the SIM cards. In some examples, new identifier information is allocated to the SIM cards subjected to paging collision to change the POs of the SIM cards subjected to paging collision, thereby avoiding paging collision between the SIM cards.

In an embodiment of the present disclosure, when the second network device determines reception of the paging collision indication information from two or more SIM cards of the UE, the second network device generates the paging collision resolution information for at least one of the two or more SIM cards. When paging collision occurs to two SIM cards, paging occasion (PO) overlap may be avoided by changing identifier information of one of the two SIM cards, or by changing the identifier information or paging offsets or the like of the two SIM cards at the same time. When paging collision occurs to three or more SIM cards, paging collision may be avoided by changing the identifier information or paging offset of one of the three or more SIM cards or by changing the identifier information or paging offsets of two or more SIM cards of the three or more SIM cards or by changing the identifier information or paging offsets of all of the SIM cards. In this way, paging collision of the SIM cards can be avoided.

After generating the paging collision resolution information, the second network device may directly send the paging collision resolution information to the UE or forward the paging collision resolution information to the UE by the first network device.

The essence of the technical solution of the embodiments of the present disclosure will be further set forth with an example.

If the multi-SIM-card UE in an inactive state detects a paging collision, the multi-SIM-card UE needs to report the detected paging collision to the network.

The multi-SIM-card UE in an inactive state may report the paging collision by one of multiple SIM cards. The multi-SIM-card UE in an inactive state may also report the paging collision by two of multiple SIM cards.

The multi-SIM-card UE may report the detected paging collision to the network in a connection resume process. The multi-SIM-card UE may report the detected paging collision to the base station through an RRCResumeRequest signaling (for an NR system), or an RRCConnectionResumeRequest signaling (for an eLTE system).

The multi-SIM-card UE may report the detected paging collision to the base station through an RRCResumeComplete signaling (NR system) or an RRCConnectionResume-Complete signaling (eLTE system).

After receiving a connection resume request signaling containing the paging collision indication information, the base station may obtain the paging collision resolution information and send the paging collision resolution information to a SIM card sending a connection resume request to the base station.

The base station may send the paging collision resolution information through an RRC signaling, an RRCResume signaling (NR system) or an RRCConnectionResume signaling (eLTE system).

In this example, the paging collision resolution information may include one or more of paging reason, UE_offset, PO_offset, and new UE identifier.

The base station may determine on itself which paging collision resolution information can be generated and send the determined paging collision resolution information to the multi-SIM-card UE.

The base station may notify the paging collision indication information sent by the multi-SIM-card UE to the core network, which then determines which paging collision resolution information can be generated and sends the determined paging collision resolution information to the multi-SIM-card UE.

The core network may send the paging collision resolution information to the multi-SIM-card UE through an NAS signaling.

The core network may send the paging collision resolution information to the base station which then forwards the paging collision resolution information to the multi-SIM-card UE.

Figure 5:
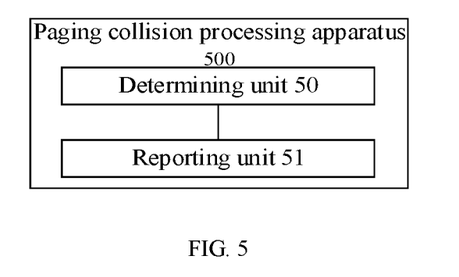
FIG. 5 is a structural schematic diagram illustrating a paging collision processing apparatus according to an embodiment of the present disclosure.

FIG. 5 is a structural schematic diagram illustrating a paging collision processing apparatus 500 according to an embodiment of the present disclosure. As shown in FIG. 5, the paging collision processing apparatus 500 in this embodiment may include a determining unit 50 and a reporting unit 51. The determining unit 50 is configured to determine whether a paging collision occurs and trigger a reporting unit 51 upon occurrence of the paging collision. The reporting unit 51 is configured to report paging collision indication information to a network device.

In an embodiment, the reporting unit 51 is further configured to report the paging collision indication information to the network device through at least one of Subscriber Identity Module (SIM) cards in an inactive state in multiple SIM cards.

In an embodiment, the reporting unit 51 is further configured to report the paging collision indication information to the network device through two or more SIM cards in an inactive state in multiple SIM cards.

In an embodiment, the reporting unit 51 is further configured to report the paging collision indication information to the network device in a connection resume process.

In an embodiment, the reporting unit 51 is further configured to report the paging collision indication information to the network device through a Radio Resource Control (RRC) signaling.

In an embodiment, the reporting unit 51 is further configured to report the paging collision indication information to the network device through an RRCResumeRequest signaling or RRCConnectionResumeRequest signaling.

In an embodiment, the reporting unit 51 is further configured to report the paging collision indication information to the network device through an RRCResumeComplete signaling or an RRCConnectionResumeComplete signaling.

In an illustrative embodiment, the determining unit 50 and the reporting unit 51 and the like may be implemented by one or more of a Central Processing Unit (CPU), a Graphics Processing Unit (GPU), a base processor (BP), an Application Specific Integrated Circuit (ASIC), a digital signal processor (DSP), a Programmable Logic Device (PLD), a Complex Programmable Logic Device (CPLD), a Field-Programmable Gate Array (FPGA), a general processor, a controller, a micro controller unit (MCU), a microprocessor, or other electronic elements, or implemented by combination with one or more Radio Frequency (RF) antennas for performing the paging collision processing method of the above embodiments.

In an embodiment of the present disclosure, the specific manners in which the units in the paging collision processing apparatus shown in FIG. 5 perform operations have been described in details in the embodiments of the relevant method and will not be repeated herein.

Figure 6:
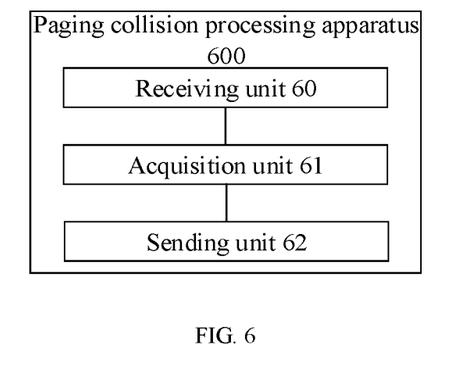
FIG. 6 is a structural schematic diagram illustrating a paging collision processing apparatus according to an embodiment of the present disclosure.

FIG. 6 is a structural schematic diagram illustrating a paging collision processing apparatus 600 according to an embodiment. As shown in FIG. 6, the paging collision processing apparatus 600 in this embodiment includes a receiving unit 60, an acquisition unit 61 and a sending unit 62. The receiving unit 60 is configured to receive paging collision indication information. The acquisition unit 61 is configured to acquire paging collision resolution information. The sending unit 62 is configured to send the paging collision resolution information to a user equipment (UE).

In an embodiment, the receiving unit 60 is further configured to: receive the paging collision indication information through a connection resume request signaling.

In an embodiment, the sending unit 62 is further configured to: send the paging collision resolution information to the UE through a Radio Resource Control (RRC) signaling.

In an embodiment, the sending unit 62 is further configured to: send the paging collision resolution information to the UE through an RRCResume signaling or an RRCConnectionResume signaling.

In an embodiment, the paging collision resolution information includes at least one of the following information: paging reason, UE_offset, paging occasion offset (PO_offset) or allocated new UE identifier information.

In an embodiment, the apparatus further includes: a generating unit (not shown), configured to determine reception of the paging collision indication information from two or more SIM cards of the UE and generate the paging collision resolution information for at least one of the two or more SIM cards.

In an illustrative embodiment, the receiving unit 60, the acquisition unit 61 and the sending unit 62 and the like may be implemented by one or more of a Central Processing Unit (CPU), a Graphics Processing Unit (GPU), a base processor (BP), an Application Specific Integrated Circuit (ASIC), a digital signal processor (DSP), a Programmable Logic Device (PLD), a Complex Programmable Logic Device (CPLD), a Field-Programmable Gate Array (FPGA), a general processor, a controller, a micro controller unit (MCU), a microprocessor, or other electronic elements, or implemented by combination with one or more Radio Frequency (RF) antennas for performing the paging collision processing method of the above embodiments.

In an embodiment of the present disclosure, the specific manners in which the units in the paging collision processing apparatus 600 shown in FIG. 6 perform operations have been described in details in the embodiments of the relevant method and will not be repeated herein.

Figure 7:
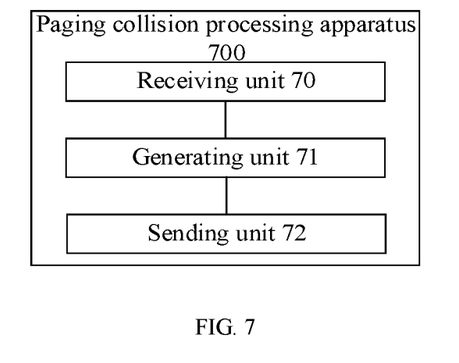
FIG. 7 is a structural schematic diagram illustrating a paging collision processing apparatus according to an embodiment of the present disclosure.

FIG. 7 is a structural schematic diagram illustrating a paging collision processing apparatus 700 according to an embodiment of the present disclosure. As shown in FIG. 7, the paging collision processing apparatus 700 in this embodiment includes a receiving unit 70, a generating unit 71, and a sending unit 72. The receiving unit 70 is configured to receive paging collision indication information forwarded by a first network device; where the paging collision indication information is sent by a user equipment (UE) to the first network device. The generating unit 71 is configured to generate paging collision resolution information based on the paging collision indication information. The sending unit 72 is configured to send the paging collision resolution information to the UE.

In an embodiment, the sending unit 72 is further configured to send the paging collision resolution information to the UE through a non-access stratum (NAS) signaling.

In an embodiment, the sending unit 72 is further configured to send the paging collision resolution information to the first network device which then sends the paging collision resolution information to the UE.

In an embodiment, the paging collision resolution information includes at least one of the following information: paging reason, UE_offset, paging occasion offset (PO_offset) or allocated new UE identifier information.

In an embodiment, the paging collision indication information forwarded by the first network device includes paging collision indication information sent from two or more Subscriber Identity Module (SIM) cards of the UE, the generating unit 71 is further configured to generate the paging collision resolution information for at least one of the two or more SIM cards.

In an illustrative embodiment, the receiving unit 70, the generating unit 71 and the sending unit 72 and the like may be implemented by one or more of a Central Processing Unit (CPU), a Graphics Processing Unit (GPU), a base processor (BP), an Application Specific Integrated Circuit (ASIC), a digital signal processor (DSP), a Programmable Logic Device (PLD), a Complex Programmable Logic Device (CPLD), a Field-Programmable Gate Array (FPGA), a general processor, a controller, a micro controller unit (MCU), a microprocessor, or other electronic elements, or implemented by combination with one or more Radio Frequency (RF) antennas for performing the paging collision processing method of the above embodiments.

In an embodiment of the present disclosure, the specific manners in which the units in the paging collision processing apparatus 700 shown in FIG. 7 perform operations have been described in details in the embodiments of the relevant method and will not be repeated herein.

Figure 8:
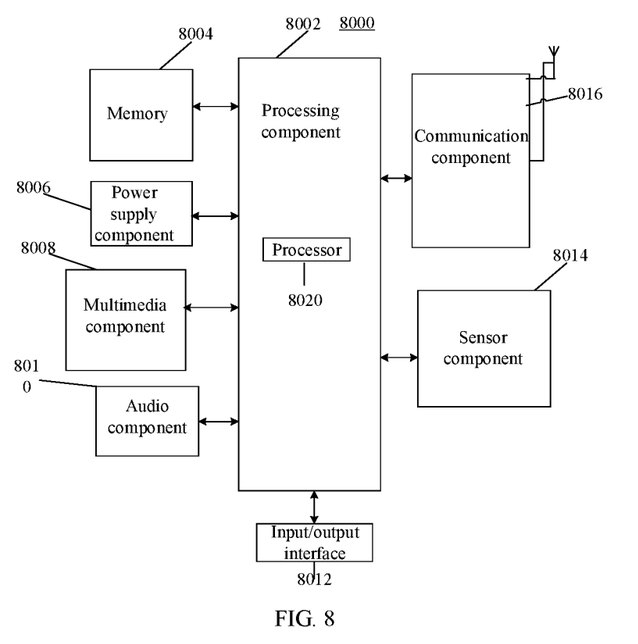
FIG. 8 is a structural schematic diagram illustrating a user equipment according to an embodiment of the present disclosure.

FIG. 8 is a block diagram of a user equipment 8000 according to an example of the present disclosure. For example, the user equipment 8000 may be a mobile phone, a computer, a digital broadcast user terminal, a message transceiver, a game console, a tablet device, a medical device, a fitness device, a personal digital assistant, and the like.

As shown in FIG. 8, the user equipment 8000 may include one or more of the following components: a processing component 8002, a memory 8004, a power supply component 8006, a multimedia component 8008, an audio component 8010, an input/output (I/O) interface 8012, a sensor component 8014 and a communication component 8016.

The processing component 8002 generally controls overall operations of the user equipment 8000, such as operations associated with display, phone calls, data communications, camera operations, and recording operations. The processing component 8002 may include one or more processors 8020 to execute instructions to complete all or part of the steps of the above methods. In addition, the processing component 8002 may include one or more modules which facilitate the interaction between the processing component 8002 and other components. For example, the processing component 8002 may include a multimedia module to facilitate the interaction between the multimedia component 8008 and the processing component 8002.

The memory 8004 is configured to store various types of data to support the operation of the user equipment 8000. Examples of such data include instructions for any application or method operated on the user equipment 8000, contact data, phonebook data, messages, pictures, videos, and so on. The memory 8004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 8006 supplies power for different components of the user equipment 8000. The power supply component 8006 may include a power supply management system, one or more power supplies, and other components associated with generating, managing and distributing power for the user equipment 8000.

The multimedia component 8008 includes a screen that provides an output interface between the user equipment 8000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 8008 includes a front camera and/or a rear camera. When the user equipment 8000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 8010 is configured to output and/or input audio signals. For example, the audio component 8010 includes a microphone (MIC) configured to receive an external audio signal when the user equipment 8000 is in an operation mode, such as a call mode, a recording mode, and a voice recognition mode. The received audio signal may be further stored in the memory 8004 or transmitted via the communication component 8016. In some examples, the audio component 8010 also includes a loudspeaker for outputting an audio signal.

The I/O interface 8012 provides an interface between the processing component 8002 and a peripheral interface module which may be a keyboard, a click wheel, a button, or the like. These buttons may include, but are not limited to a home button, a volume button, a start button, and a lock button.

The sensor component 8014 includes one or more sensors for providing a status assessment in various aspects to the user equipment 8000. For example, the sensor component 8014 may detect an open/closed state of the user equipment 8000, and the relative positioning of components, for example, the component is a display and a keypad of the user equipment 8000. The sensor component 8014 may also detect a change in position of the user equipment 8000 or a component of the user equipment 8000, the presence or absence of a user in contact with the user equipment 8000, the orientation or acceleration/deceleration of the user equipment 8000 and a change in temperature of the user equipment 8000. The sensor component 8014 may include a proximity sensor configured to detect the presence of nearby objects without any physical contact. The sensor component 8014 may also include a light sensor, such as a CMOS or CCD image sensor, for use in imaging applications. In some examples, the sensor component 8014 may also include an acceleration sensor, a gyro sensor, a magnetic sensor, a pressure sensor, or a temperature sensor.

The communication component 8016 is configured to facilitate wired or wireless communication between the user equipment 8000 and other devices. The user equipment 8000 may access a wireless network based on a communication standard, such as WiFi, 2G or 3G, or a combination thereof. In an example, the communication component 8016 receives broadcast signals or broadcast associated information from an external broadcast management system via a broadcast channel. In an example, the communication component 8016 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the user equipment 8000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above paging collision processing methods.

In an example, there is also provided a non-transitory computer readable storage medium including instructions, such as a memory 8004 including instructions, where the instructions are executable by the processor 8020 of the user equipment 8000 to perform the paging collision processing method as described above. For example, the non-transitory computer readable storage medium may be a Read Only Memory (ROM), a Random Access Memory (RAM), a CD-ROM, a magnetic tape, a floppy disk, and an optical data storage device and the like.

An embodiment of the present disclosure further provides a network device, including a processor, a transceiver, a memory and an executable program stored in the memory and run by the processor, where the processor runs the executable program to perform the steps of the paging collision processing method of the above embodiments.

An embodiment of the present disclosure further provides a user equipment including a processor, a transceiver, a memory and an executable program stored in the memory and run by the processor, where the processor runs the executable program to perform the steps of the paging collision processing method of the above embodiments.

An embodiment of the present disclosure further provides a network device, including a processor, a transceiver, a memory and an executable program stored in the memory and run by the processor, where the processor runs the executable program to perform the steps of the paging collision processing method of the above embodiments. The network device includes a device accessing a network side and a device at a core network side.

An embodiment of the present disclosure further provides a storage medium storing an executable program, where the executable program is processed by the processor to perform the steps of the paging collision processing method of the above embodiments.

In the paging collision processing method and apparatus, the user equipment, the network device and the storage medium provided by the embodiments of the present disclosure, when the UE determines a paging collision occurs to multiple SIM cards supported by itself, in a process of establishing or resuming an RRC connection with a network device such as a base station, the UE sends paging collision indication information to the network device, and the network device processes the SIM cards subjected to paging collision to generate paging collision resolution information and notify such information to the UE. In this case, the UE may perform corresponding configuration based on the paging collision resolution information sent by the network device to avoid reoccurrence of a paging collision between multiple SIM cards. In the embodiments of the present disclosure, the possibility that paging collision occurs between the multiple SIM cards can be effectively avoided, such that the probability that paging collision occurs between the multiple SIM cards is greatly reduced, thereby improving the get-through rate of the UE services and the use effect of the UE.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A paging collision processing method, comprising:
   when a user equipment (UE) determines occurrence of a paging collision, reporting paging collision indication information to a network device through two or more Subscriber Identity Module (SIM) cards in an inactive state in multiple SIM cards.

2. The method of claim 1, wherein reporting the paging collision indication information to the network device comprises:
   reporting, by the UE, the paging collision indication information to the network device in a connection resume process.

3. The method of claim 2, wherein reporting, by the UE, the paging collision indication information to the network device in the connection resume process comprises:
   reporting, by the UE, the paging collision indication information to the network device through a Radio Resource Control (RRC) signaling.

4. The method of claim 3, wherein reporting, by the UE, the paging collision indication information to the network device through the RRC signaling comprises:
   reporting, by the UE, the paging collision indication information to the network device through an RRCResumeRequest signaling or an RRCConnectionResumeRequest signaling.

5. The method of claim 3, wherein reporting, by the UE, the paging collision indication information to the network device through the RRC signaling comprises:
   reporting, by the UE, the paging collision indication information to the network device through an RRCResumeComplete signaling or an RRCConnectionResumeComplete signaling.

6. A user equipment, comprising a processor, a transceiver, a memory and an executable program stored in the memory and executed by the processor, wherein the processor runs the executable program to perform the paging collision processing method of claim 1.

7. A paging collision processing method, comprising:
   receiving, by a network device, paging collision indication information reported by a user equipment (UE) through two or more Subscriber Identity Module (SIM) cards in an inactive state in multiple SIM cards, acquiring paging collision resolution information and sending the paging collision resolution information to the UE.

8. The method of claim 7, wherein receiving, by the network device, the paging collision indication information comprises:
   receiving, by the network device, the paging collision indication information through a connection resume request signaling.

9. The method of claim 7, wherein sending the paging collision resolution information to the UE comprises:
   sending, by the network device, the paging collision resolution information to the UE through a Radio Resource Control (RRC) signaling.

10. The method of claim 9, wherein sending the paging collision resolution information to the UE comprises:
    sending, by the network device, the paging collision resolution information to the UE through an RRCResume signaling or an RRCConnectionResume signaling.

11. The method of claim 7, wherein the paging collision resolution information comprises at least one of the following information:
    paging reason, UE_offset, paging occasion offset (PO_offset) or allocated new UE identifier information.

12. The method of claim 11, further comprising:
    generating, by the network device, the paging collision resolution information for at least one of the two or more SIM cards.

13. A network device, comprising a processor, a transceiver, a memory and an executable program stored in the memory and executed by the processor, wherein the processor runs the executable program to perform the paging collision processing method of claim 7.

14. A paging collision processing method, comprising:
    receiving, by a second network device, paging collision indication information forwarded by a first network device; wherein the paging collision indication information is sent by a user equipment (UE) through two or more Subscriber Identity Module (SIM) cards in an inactive state in multiple SIM cards to the first network device; and
    generating, by the second network device, paging collision resolution information based on the paging collision indication information and sending the paging collision resolution information to the UE.

15. The method of claim 14, wherein sending the paging collision resolution information to the UE comprises:
    sending, by the second network device, the paging collision resolution information to the UE through a non-access stratum (NAS) signaling.

16. The method of claim 14, wherein sending the paging collision resolution information to the UE comprises:

sending, by the second network device, the paging collision resolution information to the first network device which then sends the paging collision resolution information to the UE.

17. The method of claim 14, wherein the paging collision resolution information comprises at least one of the following information:

paging reason, UE_offset, paging occasion offset (PO_offset) or allocated new UE identifier information.

18. The method of claim 17, wherein generating, by the second network device, the paging collision resolution information based on the paging collision indication information comprises:

generating, by the second network device, the paging collision resolution information for at least one of the two or more SIM cards.

\* \* \* \* \*